United States Patent [19]

Ueda

[11] Patent Number: 5,428,691
[45] Date of Patent: Jun. 27, 1995

[54] IMAGING APPARATUS HAVING AUTOMATIC FOCUSING FUNCTION CAPABLE OF PRECISELY PREDICTING FOCAL POINT

[75] Inventor: Kazuhiko Ueda, Yokohama, Japan

[73] Assignee: Victor Company of Japan, Ltd., Yokohama, Japan

[21] Appl. No.: 891,259

[22] Filed: Jun. 1, 1992

[30] Foreign Application Priority Data

May 31, 1991 [JP] Japan .................. 3-155366

[51] Int. Cl.$^6$ .......................................... H04N 5/232
[52] U.S. Cl. .................................. 382/199; 348/354
[58] Field of Search .................. 382/22; 358/227; 250/201.2, 201.7; 354/400; 348/376, 354, 356; H04N 5/232

[56] References Cited

U.S. PATENT DOCUMENTS

| | | | |
|---|---|---|---|
| 4,748,509 | 5/1988 | Otake et al. | 358/227 |
| 4,804,831 | 2/1989 | Baba et al. | 250/201.2 |
| 4,872,058 | 10/1989 | Baba et al. | 358/227 |
| 5,212,557 | 5/1993 | Ueda | 358/227 |

*Primary Examiner*—Leo H. Boudreau
*Assistant Examiner*—Chris Kelley
*Attorney, Agent, or Firm*—Jacobson, Price, Holman & Stern

[57] ABSTRACT

An imaging apparatus for automatic focusing, includes an imaging device for imaging an image light from an objective through a lens system, a signal processing circuit for processing a video signal output from the imaging device, and an edge extracting element for extracting high-frequency band components from signals outputted from the signal processing circuit. The apparatus further comprises a characteristics conversion circuit for converting characteristics in signals outputted from the edge extracting element in the manner that a value is set to substantially zero after extracted signals are calculated by a cubic differential of a lens moving amount of the lens system; a calculation circuit for obtaining the lens moving amount to a focal point by calculating a proportion between a linear differential and a quadratic differential; and drive circuit for driving the lens system corresponding to the lens moving amount to the focal point and outputted from the calculation circuit. In the calculation circuit, the linear differential is obtained by calculating a linear differential of a characteristics conversion signal outputted from the characteristics conversion circuit by the lens moving amount, and the quadratic differential is obtained by calculating a quadratic differential of the characteristics conversion signal by the lens moving amount.

6 Claims, 9 Drawing Sheets

PRIOR ART   PRIOR ART

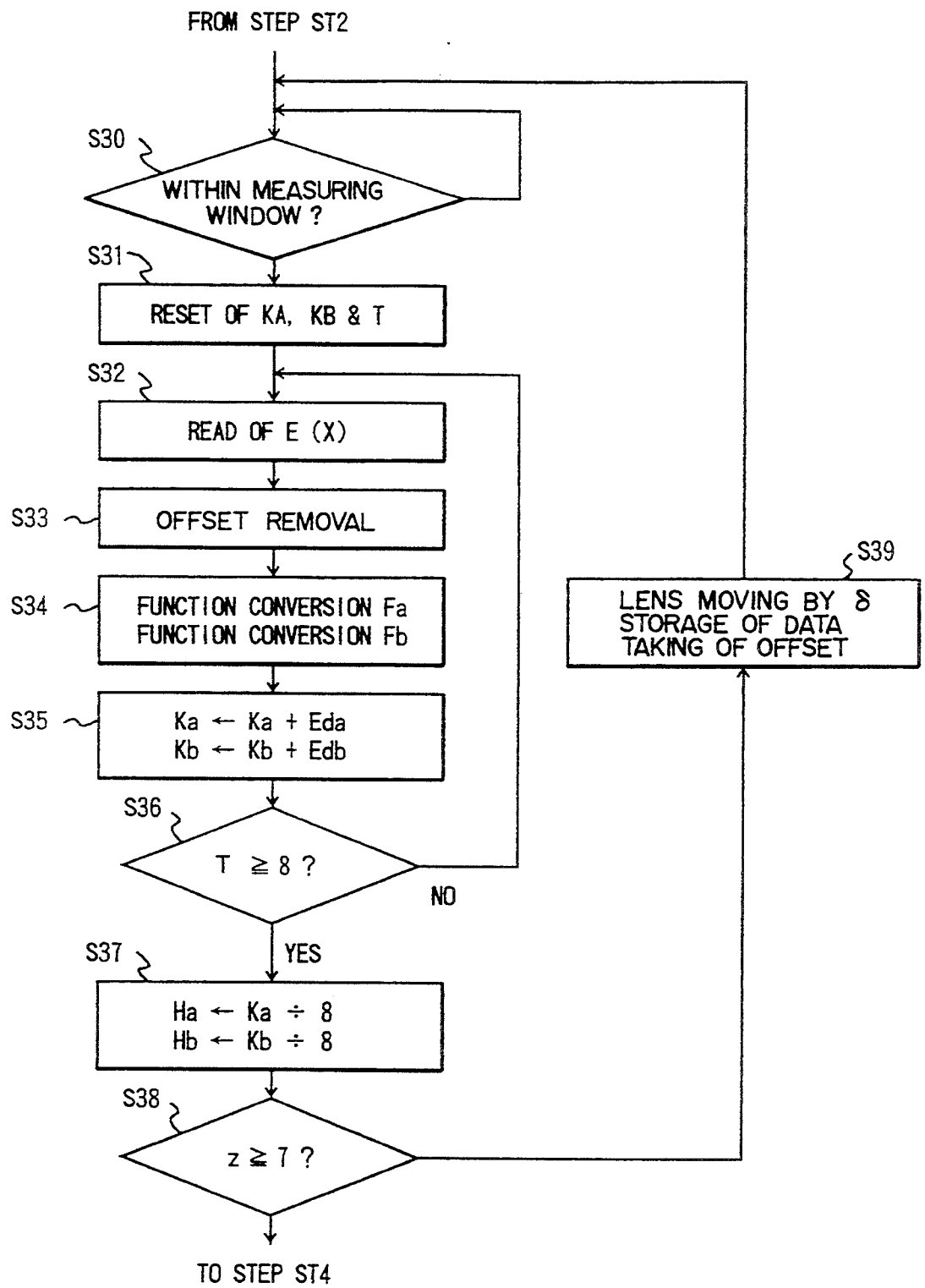
F I G. 5

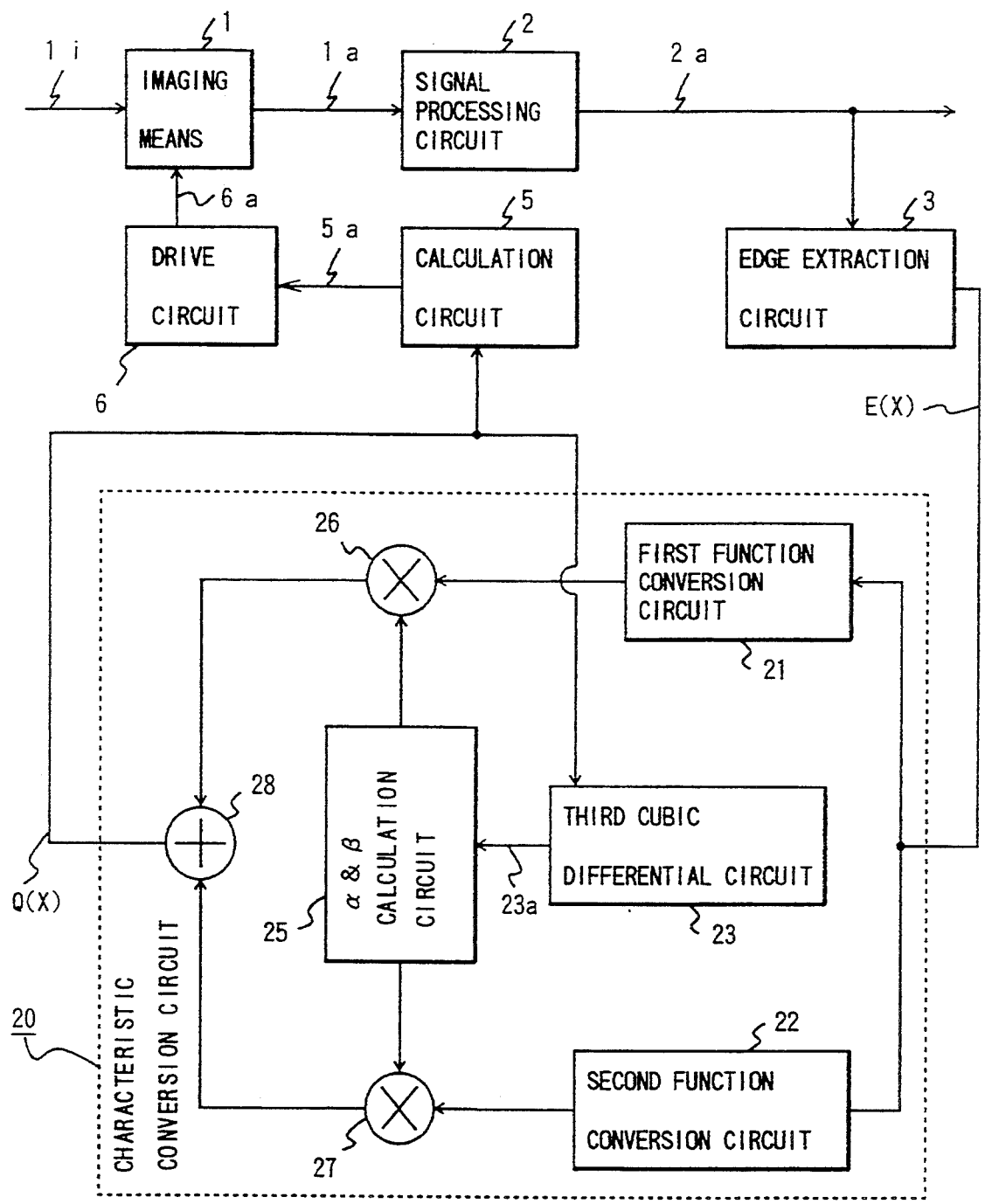
F I G. 10

IMAGING APPARATUS HAVING AUTOMATIC FOCUSING FUNCTION CAPABLE OF PRECISELY PREDICTING FOCAL POINT

BACKGROUND OF THE INVENTION

The present invention relates to an automatic focusing apparatus, and more particularly to an imaging apparatus having an automatic focusing function capable of carrying out automatic focusing With a stable detection accuracy.

FIG. 1 shows a schematic block diagram of a conventional automatic focusing imaging apparatus, and FIGS. 2A and 2B show diagrams for explaining a focal point voltage. The following is a description with reference to the drawings.

In FIG. 1, imaging means 1 images an image pick-up light $1i$ through a lens system on a photoelectric conversion plane of a photoelectric conversion element to obtain an image signal $1a$, and supplies the image signal $1a$ to a signal processing circuit 2 which amplifies the image signal $1a$ and adds a synchronous signal such as a vertical blanking signal to the image signal to obtain a video signal to supply an edge extraction circuit 3 and a recording circuit (not shown). The edge extraction circuit 3 extracts a high frequency band component in the image signal $1a$ and supplies to a logarithmic conversion circuit 4 each field of a focal point voltage E which is obtained after a detected voltage is converted from analog to digital.

Here, there is described a focal point voltage E representing an extent of an in-focus position in accordance with FIGS. 2A and 2B. When the apparatus photographs a normal picture image having a plurality of edges, the focal point voltage E has characteristics which are shaped like a hanging bell and can be approximated by an equation (1) as follows:

$$E(X) = p \cdot \text{EXP}[-qX^2] \quad (1),$$

where p and q are constants.

A logarithm conversion circuit 4 performs a logarithm conversion for the focal point voltage E to output a logarithm conversion signal $4a$. When a voluntary field is n, the logarithm conversion signal $4a$ is represented by an equation as follows:

$$\text{Log}[E(X)] = \text{Log}\, p - q \times X^2 \quad (2)$$

Then, a calculation circuit 5 to which the logarithm conversion signals $4a$ are supplied, compares the signals $4a$ in an n field and an "n+1" field to calculate a moving amount X of the lens at the position having the maximum value $E_{max}$ of the focal point voltage E in accordance with an equation (3) as follows:

$$X = E^{(1)}(X)/E^{(2)}(X) \quad (3)$$

The calculation circuit 5 supplies to a drive circuit 6 a drive circuit control signal $5a$ which is obtained as a calculation result on the basis of the moving amount X of the lens. The drive circuit 6 causes the lens which is mounted in the imaging means 1 and not shown in the figure to be in focus, and therefore, the conventional imaging apparatus performs the automatic focusing operation.

In the conventional technology described above, the focal point voltage E has the characteristics shown in FIG. 2A, assuming the case that a normal picture signal including a plurality of frequency components is imaged, and automatic focusing operation is performed on the basis of the logarithm conversion signal $4a$ which is obtained by logarithm conversion in the circuit 4.

However, when the image signal only including a specific frequency component is recorded, the focal point voltage E does not always have the characteristics shown in FIG. 2. For example, when the apparatus images vertical stripes having the same intervals, the focal point voltage E(X) has the characteristics shown in FIG. 2B, and cannot be approximated by the equation (1), and so it is impossible to precisely perform automatic focusing operation.

SUMMARY OF THE INVENTION

An object of the present invention is to provide an imaging apparatus capable of automatically and precisely focusing even in the case that the image signal only includes the specific frequency component, and capable of automatically focusing in a rapid and natural movement even when images are significantly out of focus.

The present invention provides the following components in order to solve the above problem. Namely, an imaging apparatus for automatic focusing of the present invention comprises imaging means for imaging an image light from an objective through a lens system on a photoelectric plane of a photoelectric conversion device; a signal processing circuit for processing a video signal outputted from the imaging means; and edge extracting means for extracting high-frequency band components from signals outputted from the signal processing circuit: wherein the apparatus further comprises characteristics conversion means for converting characteristics in signals outputted from the edge extracting means in the manner that a value is set to substantially zero after the extracted signals are calculated by a cubic differential of a lens moving amount of the lens system; a calculation circuit for obtaining the lens moving amount to a focal point by calculating a proportion between a linear differential and a quadratic differential, the linear differential which is obtained by calculating a linear differential of a characteristics converted signal outputted from the characteristics conversion means by the lens moving amount, and the quadratic differential which is obtained by calculating a quadratic differential of characteristics converted signal by the lens moving amount; and drive means for driving the lens system corresponding to the lens moving amount to the focal point, and outputted from the calculation circuit.

By the above construction of the present invention, since the lens moving amount is calculated on the basis of the characteristics converted signal from the characteristics conversion circuit for converting the characteristics of the edge extracted signal in the manner that the edge extracted signal is set to substantially zero by the cubic differential of the lens moving amount, there can be obtained an imaging apparatus capable of automatically and precisely focusing even in the case that the image signal only includes the specific frequency component, and capable of automatically focusing in a rapid and natural movement even when the images are sharply out of focus.

BRIEF DESCRIPTION OF THE DRAWINGS

In the accompanying drawings:

FIG. 5 is a flow chart showing a further detailed processing of step ST3 in the processing shown in FIG. 4;

FIG. 10 is a block diagram showing a schematic construction of an imaging apparatus having automatic focusing function according to a third embodiment of the present invention.

DETAILED DESCRIPTION OF THE PREFERRED EMBODIMENTS

There is a description of the preferred embodiments of the present invention in reference with the attached drawings.

I. A First Embodiment

Figure 6:
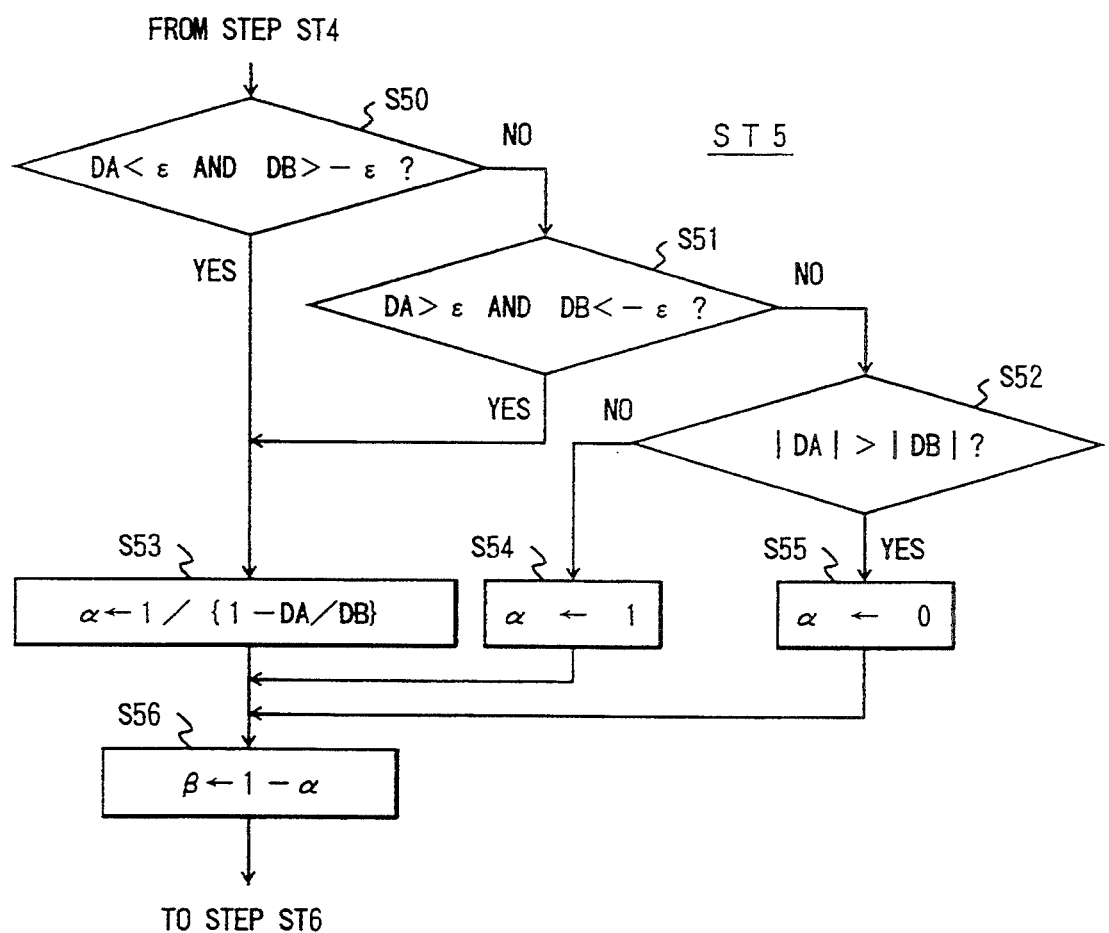
FIG. 6 is a flow chart showing a further detailed processing of step ST5 in the processing shown in FIG. 4.

A first embodiment of an imaging apparatus having an automatic focusing function and according to the present invention, is first described with reference to FIG. 3, and following is a description of a processing operation of a microcomputer as a main portion of the present invention, with reference to FIGS. 4, 5 and 6.

Figure 1:
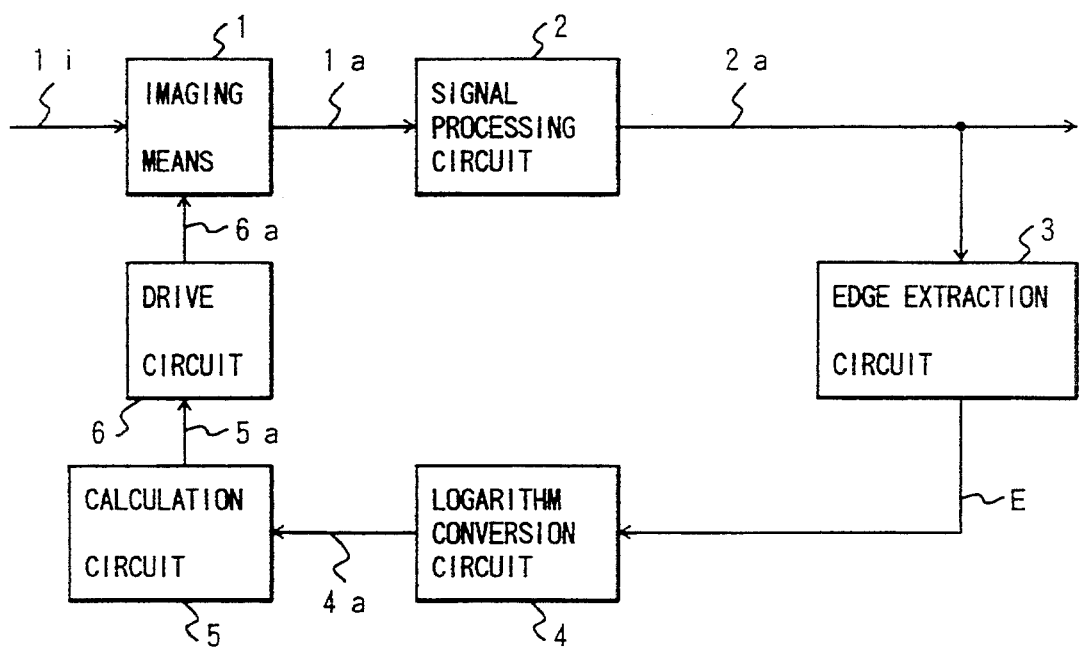
FIG. 1 is a block diagram showing a schematic construction of a conventional imaging apparatus having an automatic focusing function.
Figures 2A, 2B:
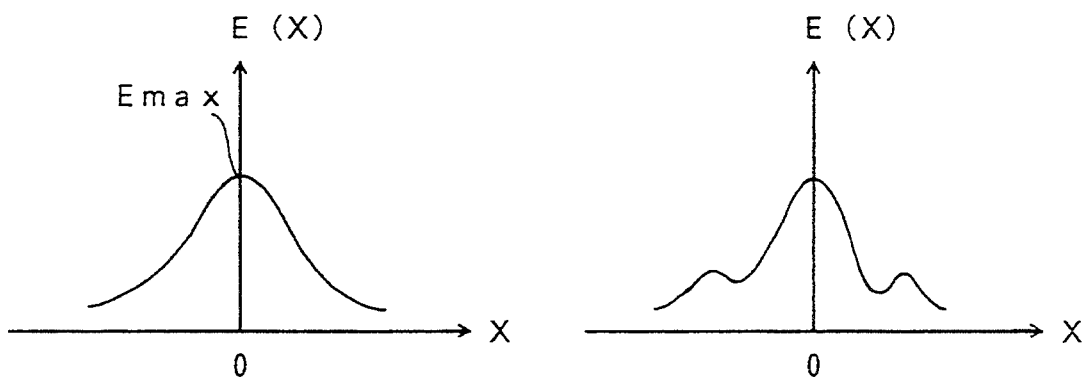
FIGS. 2A and 2B are characteristics charts for explaining an operation of the imaging apparatus shown in FIG. 1.
Figure 3:
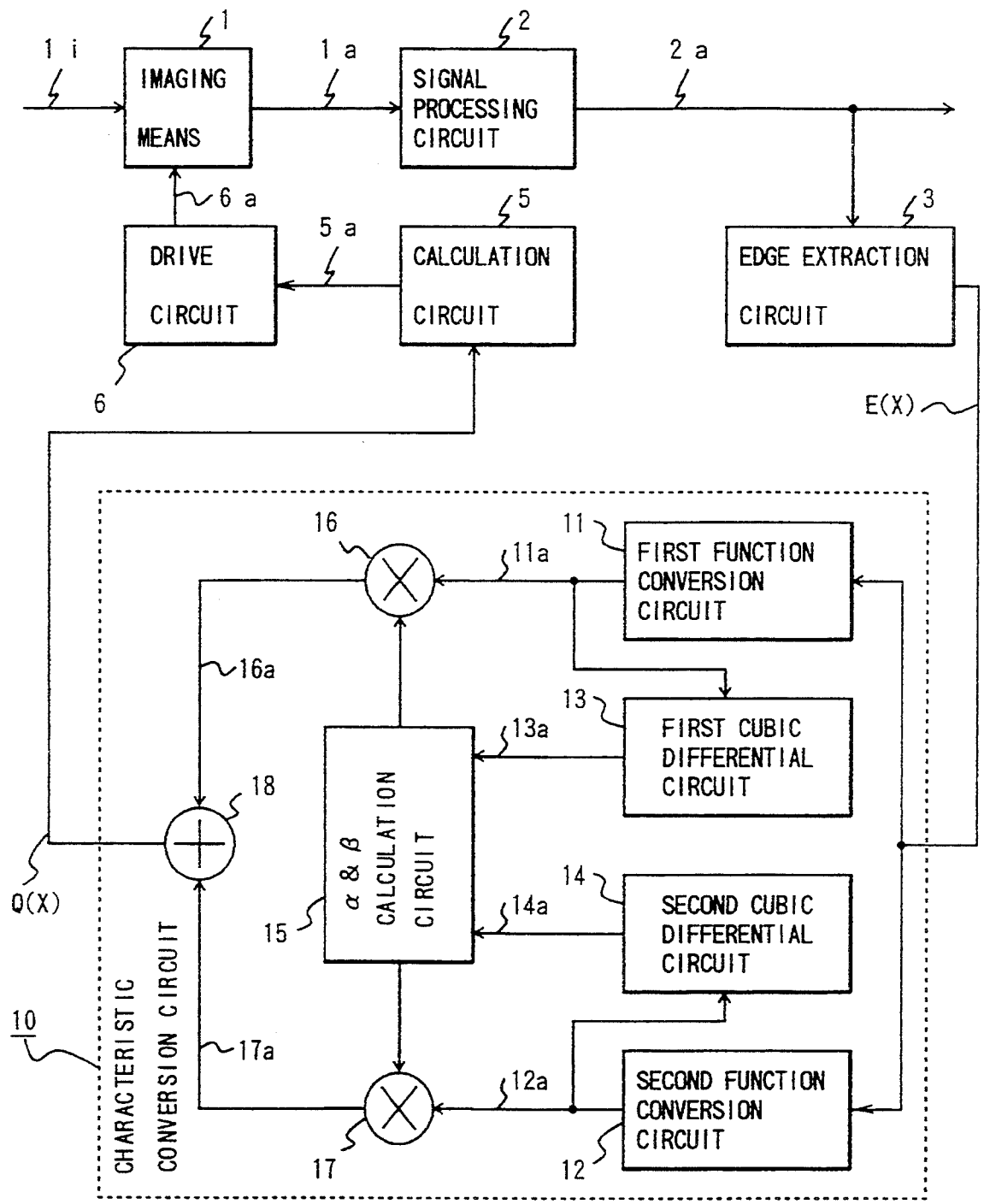
FIG. 3 is a block diagram showing a schematic construction of an imaging apparatus having an automatic focusing function according to a first and second embodiments.

(a) An outline of an imaging apparatus:

In FIG. 3, since only the different point between the first embodiment and the conventional apparatus resides in that an apparatus of this embodiment comprises a characteristics conversion means 10, and other constructions of this embodiment are the same as those of the conventional apparatus, a duplicative description will be omitted.

The characteristics conversion means 10 is provided for compressing degrees of a focal point voltage E(X) to a quadratic form. The principle of the present invention is first described in comparison with that of the conventional apparatus, and then there is a description of how to compress the degrees of the focal point voltage E(X) to the quadratic form.

(b) A compression principle:

A focal point voltage E which is supplied from the edge extracting circuit to the characteristics conversion means, is represented as a function of a discrepancy amount X between a lens position in focus and a present lens position. When the lens system is in focus (X=0), the function is an even function having the maximum value $E_{max}(=a_0)$ and can be shown in an equation (4) as follows:

$$E(X) = a_0 + a_1 \times X^2 + \ldots + a_{m-1} \times X^{2(m-1)} + a_m \times X^{2m} \qquad (4),$$

where m is a natural number.

Even though the conventional apparatus approximates the focal point voltage by using the equation (1), this embodiment is considered as more general.

Here, an equation (5) shows a function $E^{(2m-1)}(X)$ which is obtained by (2m−1)-th differentiating of the focal point voltage E(X) with respect to a discrepancy amount X, and an equation (6) shows a function $E^{(2m)}(X)$ which is obtained by 2m-th differentiating the focal point voltage E(X) by a discrepancy amount X.

$$E^{(2m-1)}(X) = (2m!/1!) \times a_m \times X \qquad (5)$$

$$E^{(2m)}(X) = 2m! \times a_m \qquad (6)$$

Subtracting the equation (6) from the equation (5) can provide the discrepancy amount X between the lens position at being in focus and the present lens position and which can be represented by an equation (7) as follows:

$$X = E^{(2m-1)} \times (X) / E^{(2m)} \times (X) \qquad (7)$$

When an arbitrary field is assumed as an n field, a differential of the focal point voltage E(X) in the n field by the discrepancy X of the lens position needs to be obtained the difference between E(X) in the n field and "n−1" field in the case that the lens moves a fine amount o from the n field to the "n−1" field. At this time, a signal to noise ratio (S/N) in the difference component deteriorates. Since the focal point voltage E(X) is the function having a wide skirt, the stage number m is a large value, thereby providing the problem that the S/N of the difference component is added and accumulated when the 2m-th derivative is obtained.

Accordingly, the characteristics conversion means performs adaptive non-linear conversion processing from the focal point voltage E(X) represented by the equation (4) into a characteristics converted signal Q(X) represented by an equation (8) as follows:

$$Q(X) = R[E(X)] = b_0 + b_1 \times X^2 \qquad (8)$$

Since the equation (8) is a quadratic equation, the discrepancy amount X of the lens position is obtained by differentiating the focal point voltage E(X) twice to obtain the equations (5), (6) and (7), thereby decreasing errors and simplifying the calculation. This calculation is performed by a calculation circuit described later. Accordingly, it is possible to obtain the discrepancy amount X of the lens position. The following is a description of the compression of the degree number by the adaptive non-linear conversion processing.

(c) A compression of E(X) to quadratic form:

The focal point voltage E(X) is supplied to first and second function conversion circuits 11 and 12 in the characteristic conversion means 10, in which a function conversion is performed by using a first and second functions Fa and Fb to obtain a first and second function converted signals 11a and 12a. The first and second function Fa and Fb are respectively represented, for example, by equations (9) and (10):

$$Fa(X) = 100 \times \{Log[E(X) + 0.1] - 3\} \quad (9)$$

$$Fb(X) = 256 \times [E(X)/256]^{1.5} \quad (10)$$

The first and second signals 11a and 12a are supplied to first and second cubic differential circuits 13 and 14 and first and second multiplication circuits 16 and 17, respectively. The first and second cubic differential circuits 13 and 14 respectively perform a cubic differential calculation to output first and second cubic differential signals 13a and 14a to a weighting coefficient calculation circuit 15. The circuit 15 obtains weighting coefficients $\alpha$ and $\beta$ for a supply to the first and second multiplication circuit 16 and 17. The first and second multiplication circuits 16 and 17 respectively multiply the first and second function converted signals 11a and 12a by the weighting coefficients $\alpha$ and $\beta$ to obtain a first and second multiplied signal 16a and 17a and to output them to an addition circuit 18. The circuit 18 adds both the signal 16a and 17a to obtain a characteristic conversion output signal Q(X) and to output it to the calculation circuit 15.

Here, conversion characteristics of the means 10 is represented in an equation (11) by using the signal Q(X) and the focal point voltage E(X), $$Q(X) = \alpha \times Fa[E(X)] + \beta \times Fb[E(X)] \quad (11)$$

Since added value of the first and second weighting coefficients $\alpha$ and $\beta$ can be obtained by an equation (12) as follows:

$$1 = \alpha + \beta \quad (12)$$

As the characteristic means output signal Q(x) coincides to the calculation result of the equation (8), the number of degrees of the equation (11) is limited to a quadratic. Accordingly, a required condition therefore is zero of the cubic differential of the output signal Q(X) and the three stage differential $Q^{(3)}(X)$ of the signal Q(X) is represented by a following equation, $$Q(X) = \alpha \times Fa^{(3)}[E(X)] + \beta \times Fb^{(3)}[E(X)] = 0 \quad (13)$$

In the equation (13), $Fa^{(3)}$ and $Fb^{(3)}$ represent the three-stage differential of the first and second conversion functions Fa and Fb, respectively, which are obtained by the first and second cubic differential circuits 13 and 14. The weighting coefficient calculation circuit 15 can obtain the first and second weighting coefficients $\alpha$ and $\beta$ by calculating equations (14) and (15) by using the equations (12) and (13), $$\alpha = 1/\{1 - Fa^{(3)} \times [E(X)]/Fb^{(3)}[E(X)]\} \quad (14)$$

$$\beta = 1/\{1 - Fb^{(3)} \times [E(X)]/Fa^{(3)}[E(X)]\} \quad (15)$$

The characteristics conversion signal Q(X) obtained as above, is supplied to the calculation circuit 15 which calculates the equation (7) to output the lens moving amount X.

(d) Processing operation of the microcomputer:

As described above, the characteristic conversion means 10 has the above configuration and function, and the means 10 and the calculation circuit 15 can be realized by using a microcomputer which will be described later.

Figure 4:
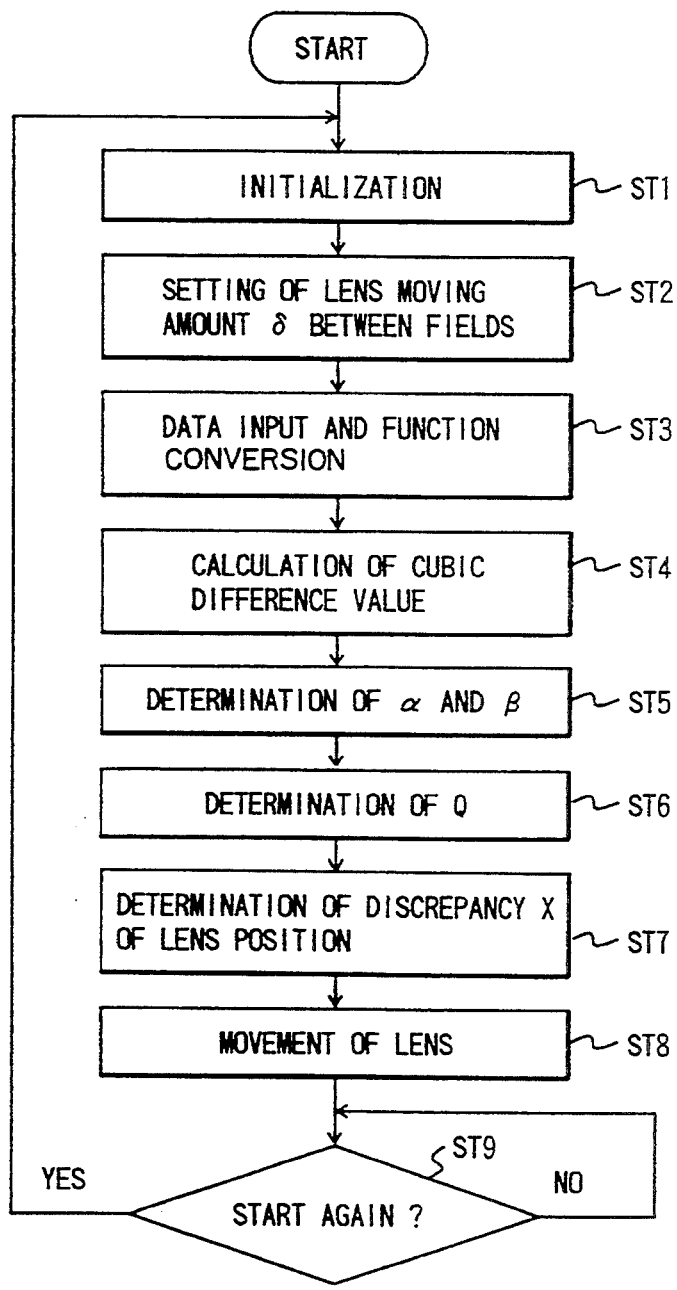
FIG. 4 is a flow chart showing a processing of a microcomputer for realizing a characteristics conversion circuit and a calculation circuit of the apparatus shown in FIG. 3.

In FIG. 4, processing in the microcomputer starts at step ST0 and advances to step ST1 in which an initialization is executed to reset registers inside the microcomputer or the like, thereby advancing the operation to step ST2.

In step ST2, the lens moving amount between fields is determined on the basis of focal point depth information outputted from the imaging system 1 in order to calculate the differential with respect to the discrepancy amount X of the lens position at step ST4 described later.

The reason why the moving amount is determined by the focal point depth information, is to avoid not only quantization error and noise influence but also an erroneous calculation. Since the focal point voltage E(X) becomes the bell-shaped function having gentle skirts when the lens moving amount between fields is fixed and the focal point depth of the lens is deep, it is possible to increase the quantization error and the noise influence because the focal point voltage E(X) between fields decreases. On the other hand, since the focal point voltage E(X) has the function of a sharp mountain shape when the focal point depth of the lens is shallow, the difference value of the focal point voltage E(X) becomes too large, so it is impossible to perform precise calculation.

For example, the lens moving amount between fields on the basis of the focal point depth information can be determined by inputting, as an address, digital data into which analog data of the focal point depth information obtained by the imaging means 1 are converted, into a read only memory (ROM) storing the lens moving amount. The lens moving amount determined is assumed as $\delta$, and the operation advances to step ST3.

The detailed description with respect to step ST3 is written later, but an outline of step ST3 is described in this part. The operation in step ST3 corresponds to that of the first and second function conversion circuits 11 and 12. The circuits 11 and 12 obtain data of every seven fields, each field which has the first and second conversion data Ha and Hb which are obtained by converting the focal point voltage E(X) by the first and second conversion functions Fa and Fb, thereby advancing operation to step ST4. Here, the first and second converted data Ha and Hb in the previous seven fields are assumed as $H_{a-3}$, $H_{b-3}$, $H_{a-2}$, $H_{b-2}$, $H_{a-1}$, $H_{b-1}$, $H_{a0}$, $H_{b0}$, $H_{a+1}$, $H_{b+1}$, $H_{a+2}$, $H_{b+2}$, $H_{a+3}$, and $H_{b+3}$, respectively.

Step ST4 corresponds to the first and second cubic differential circuits 13 and 14, in which the first and second cubic differential data Da and Db are obtained by equations (16) and (17) in order to perform the cubic differential calculation on the basis of the first and second conversion data Ha and Hb, $$Da = (H_{a3} - 3 \times H_{a1} + 3 \times H_{a-1} - H_{a-3})/(2\delta)^3 \quad (16)$$

$$Db = (H_{b3} - 3 \times H_{b1} + 3 \times H_{b-1} - H_{b-3})/(2\delta)^3 \quad (17)$$

The cubic difference data Da and Db correspond to the first and second cubic differential signals 13a and 14a, thereby advancing the operation to step ST5.

Step ST5 is also described later in detail, but it corresponds to the weighting coefficient calculation circuit 15 which determines the first and second weighting coefficients $\alpha$ and $\beta$. When step ST5 is completed, the operation advances to step ST6.

The operation in step ST6 corresponds to that of the first and second multiplication circuits 16 and 17 and the addition circuit 18. The weighted mean value Q as the final output of step ST6 corresponds to the characteristic conversion output signal Q(X). In step ST6, the weighted mean value Q between the first and second converted data Ha and Hb is obtained by using the first and second weighting coefficients $\alpha$ and $\beta$ which are obtained in step ST5. The weighted mean value Q is obtained for each one field within the interval of the seven fields corresponding to the first and second converted data $H_{a-3}$ and $H_{b-3}$ through $H_{a+3}$ and $H_{b+3}$. Here, the weighted mean value Q in the seven fields interval is assumed as $Q_{-3}$, $Q_{-2}$, $Q_{-1}$, $Q_0$, $Q_{+1}$, $Q_{+2}$ and $Q_{+3}$. The operation advances to step ST7 after completing step ST6.

$$Q = \alpha \times Ha + \beta \times Hb \quad (18)$$

Step ST7 corresponds to the calculation circuit 15 in which linear difference data D and quadratic difference data E with respect to the weighted mean value Q are sequentially obtained according to equations (19) and (20), respectively, $$D = (Q_1 - Q_{-1})/(2\delta) \quad (19)$$

$$E = (Q_2 - 2 \times Q_0 + Q_{-2})/(2\delta)^2 \quad (20)$$

The discrepancy amount X between lens positions at the in-focus point and at the present time is obtained by a calculation of the proportion of the linear difference data D and quadratic difference data E in accordance with an equation (21), $$X = D/(E - 3 \times \delta) \quad (21)$$

A value "$-3 \times \delta$" is a compensation value because the present lens position is discrepant from a center position of the difference. The operation advances to step ST8 after completing step ST7.

In step ST8, the in-focus point is obtained by supplying to the imaging means 1 the discrepancy amount X of the lens position obtained in step ST7, thereby advancing the operation to step ST9.

In step ST9, the determination is performed as to whether restarting is necessary. This determination can be considered when, for example, the imaged object is sharply changed within the interval from step ST2 to step ST8, that a change of the signal level of the focal point voltage E(X) is detected and a presence and absence of necessity of restarting is determined. When restarting is necessary, the operation returns to step ST2 and is repeated from steps ST2 to ST8, so that restarting is determined again at step ST9. On the other hand, when restarting is not necessary, this determination is repeated again in step ST9.

Here, step ST3 is described in detail in accordance with FIG. 5.

At first, in step S30, it is determined whether or not the present operation is within a distance measuring window interval. This determination is performed, for example, with an accumulate addition counter starting an addition using the vertical blanking signals generated in the signal processing circuit 12 as the reference at the starting point of addition, and an accumulated addition value obtained by the accumulated addition counter is determined. The counter integrates and adds clock signals in the microcomputer.

When the object is determined without the distance measuring window interval, the above-described determination is repeated in step S30. On the other hand, when the object is determined to be within the distance measuring window interval, the operation advances to step S31.

In step S31, accumulated addition memories KA and KB are reset and accumulated addition counter T is reset. The memory KA and KB accumulate an addition of first and second function conversion data Ka and Kb which are obtained in step S34 described later. The counter T accumulates an addition as to how many times repeat from steps S32 to S35. When step S31 ends, the operation advances to step S32.

In step S32, the focal point voltage E(X) is read out from the edge extracting circuit through an analog/digital converter (not shown) to the microcomputer for processing the function conversion in step S34.

In step S33, in order to improve an accuracy of calculation performed in later steps, an offset voltage is removed from the focal point voltage E(X). Namely, the focal point voltage E(X) during the vertical blanking interval is extracted from the focal point voltage E(X) in the distance measuring window obtained in step S32, thereby obtaining the focal point voltage E(X) which has the offset voltage removed. The focal point voltage during the vertical blanking interval is previously read out through the analog/digital converter not-shown in the microcomputer. Here, this focal point voltage E(X) is called as an offset removed focal point voltage Ed. The operation advances to step S34 after completing step S33.

In step S34, the first and second function conversions Fa and Fb are performed to the off-set removed focal point voltage Ed by look-up table method using the ROM to obtain Eda and Edb by equations (22) and (23), respectively. The operation advances to step S35 after completing step S34.

$$Eda = Fa(Ed) = 100 \times \{Log(Ed + 0.1) - 3\} \quad (22)$$

$$Edb = Fb(Ed) = 256 \times (Ed/256)^{1.5} \quad (23)$$

In step S35, the first and second function conversion data Eda and Edb are accumulatively added each other to obtain first and second accumulative function converted data Ka and Kb, respectively. This accumulative addition is repeated eight times, and the operation advances to step S36 after completing step S35.

In step S36, the processing from steps S32 to S35 are repeated, and a judgment performed for whether the cumulative value t of the counter T is eight or more. When the value t is less than eight, the operation returns to step S32 again and processing from steps S32 to S35 is repeated. When step S36 completes, the operation advances to step S37.

In step S37, the first and second mean function converted data Ha and Hb as mean values of the first and second function converted data Eda and Edb is calculated on the basis of the first and second accumulative function converted data Ka and Kb and using equations (24) and (25) as follows:

$$Ha = Ka/8 \quad (24)$$

$$Hb = Kb/8 \quad (25)$$

Then, the operation advances to step S38 after completing step S37. In step S38, it is determined whether or not the number of processing times z from steps S32 to S35 are seven or more. When z is over seven, the processing in step ST3 is completed and advances to step ST4, and when z is less than seven, the operation advances to step S39.

In step S39, the first and second mean function conversion data Ha and Hb are stored, which are obtained in step S37. The focal point voltage E(X) during the vertical blanking interval is newly taken in order to remove the offset voltage of the focal point voltage E(X) in step S33. Furthermore, the lens position moves by the moving amount which is set in step ST2. When the operation of step S39 is completed, the operation advances to step S30, and processing from steps S30 to S38 is repeated seven times.

Accordingly, in step ST3, there can be respectively obtained the first and second conversion data Ha and Hb in seven times which can be represented as $H_{a-3}$ and $H_{b-3}, \ldots H_{a+3}$ and $H_{b+3}$.

Next, there will be described the operation of step ST5 in accordance with FIG. 6.

Step ST5 is to respectively determine the first and second weighting coefficients $\alpha$ and $\beta$ corresponding to the first and second cubic difference data Da and Db. At first, the first weighting coefficient $\alpha$ is determined in steps S50 to S55, and then, the second weighting coefficient $\beta$ is determined in step S56.

In step S50, the cubic difference data Da and Db are determined as to whether or not the first data Da is less than the reference value $\epsilon$, and whether or not the second data Db is larger than the reference value $-\epsilon$. When the above conditions are sufficient, the operation advances to step S53 in which the first weighting coefficient $\alpha$ is determined by an equation. When the condition is not sufficient, the operation advances to step S51 and further determination is performed.

In step S51, the cubic difference data Da and Db are determined for whether or not the first data Da is larger than the reference value $\epsilon$, and whether or not the second data Db is less than the reference value $-\epsilon$. When the above conditions are sufficient, the operation advances to step S53 in which the first weighting coefficient $\alpha$ is determined by an equation. When the condition is not sufficient, the operation advances to step S52 and further determination is performed.

In step S52, the determination is performed as to whether or not an absolute value of the first cubic difference data Da is larger than an absolute value of the second cubic difference data Db. When the condition is sufficient, the operation advances to step S54 in which the first weighting coefficient $\alpha$ is set to zero, thereby advancing to step S56. On the other hand, when the condition is not sufficient, the operation advances to step S55 in which the first weighting coefficient $\alpha$ is set to 1, thereby advancing to step S56.

In step S53, the first weighting coefficient $\alpha$ is determined in accordance with an equation (26), thereby advancing to step S56.

$$\text{ti } \alpha = 1/\{1 - Da/Db\} \tag{26}$$

In step S56, the second weighting coefficient $\beta$ is determined in accordance with an equation (27), and when step S56 is completed, step ST5 ends, thereby advancing to step ST6.

$$\beta = 1 - \alpha \tag{27}$$

Accordingly, the first and second weighting coefficients $\alpha$ and $\beta$ are respectively determined.

II. A Second Embodiment

In the first embodiment, the first and second weighting coefficients $\alpha$ and $\beta$ are obtained by using the first and second cubic difference data Da and Db which are calculated by the equations (16) and (17) in step ST3. However, the first and second cubic difference data Da and Db are not always accurate because four kinds of the first and second converted data Ha and Hb in the equations (16) and (17) have the accumulated errors.

Accordingly, in a second embodiment, the first and second weighting coefficients $\alpha$ and $\beta$ are determined by fuzzy inference, thereby accurately determining the first and second weighting coefficients $\alpha$ and $\beta$ even though the first and second converted data Ha and Hb include errors, it is possible to realize more accurately automatic focusing operation as a result.

The only difference between the first and second embodiments is step ST5 in FIG. 4 for obtaining the first and second weighting coefficients $\alpha$ and $\beta$. Since the other components of the second embodiment are the same as those of the first embodiment, a duplicate description will be omitted.

Figure 7:
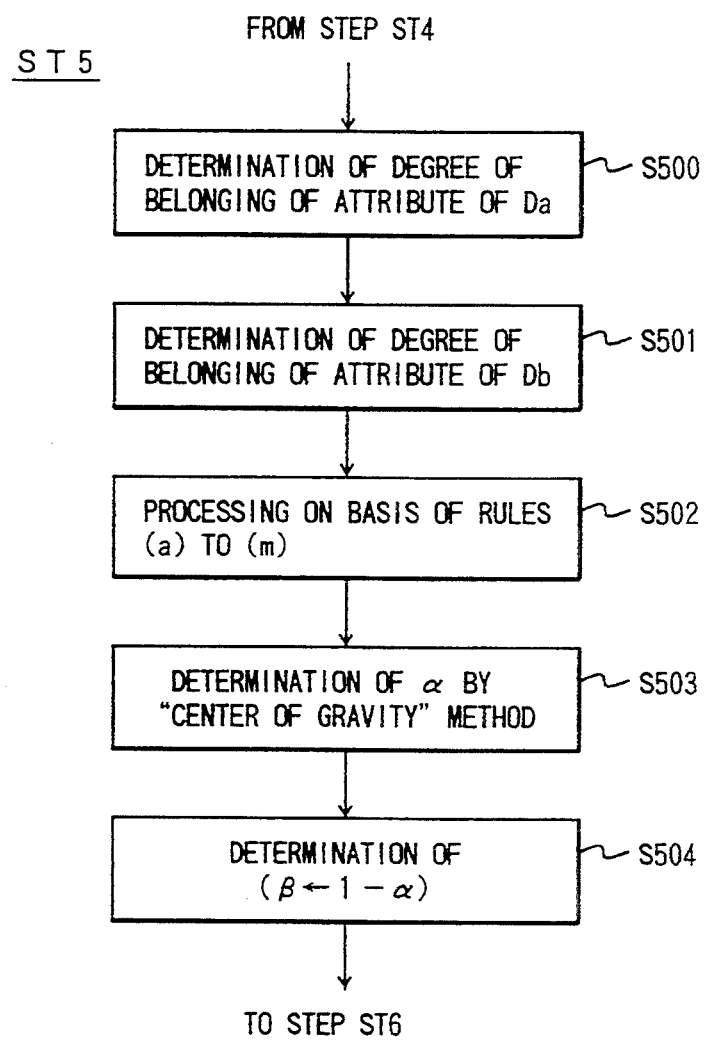
FIG. 7 is a flow chart showing a detailed processing of a microcomputer mounted on an imaging apparatus and having an automatic focusing function according to a second embodiment of the present invention.

The second embodiment is described in accordance with FIG. 7. The first weighting coefficient $\alpha$ is determined from steps S500 to S503 by using the fuzzy inference, and the second weighting coefficient $\beta$ is determined in step S504 by using the first weighting coefficient $\alpha$ obtained in former steps.

In step S500, a degree of belonging of an attribute of the first cubic difference data Da is determined before rules are applied in step S502. Here, the attribute is provided five kind types which respectively represent attributes of the first cubic difference data Da, that is, NBa is extremely smaller than that of the center, NSa is smaller than that of the center, ZEa is near the center, PSa is larger than that of the center, and PBa is extremely larger than that of the center. The degree of belonging is the number of degrees in which the data belonging to the each attribute, and degrees of belonging G1a to G5a of NBa to PBa can be shown in the following equations (28) to (32) by using a function M (an attribute Da) representing a degree of belonging, $$G1a = M(NBa, Da) \tag{28}$$

$$G2a = M(NSa, Da) \tag{29}$$

$$G1a = M(ZEa, Da) \tag{30}$$

$$G1a = M(PSa, Da) \tag{31}$$

$$G1a = M(PBa, Da) \tag{32}$$

Figure 8A:
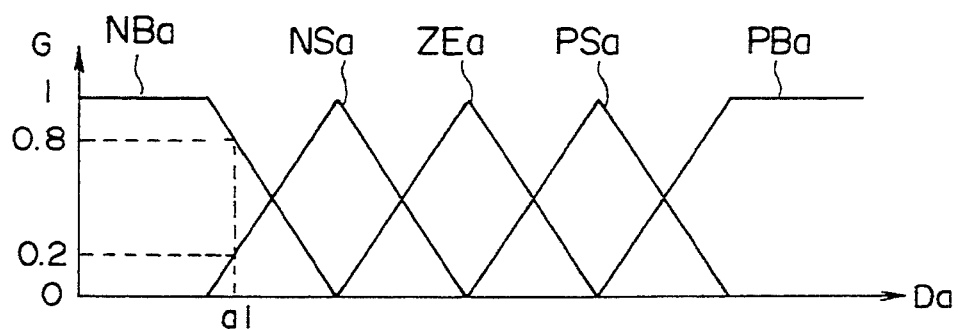
FIGS. 8A to 8C are characteristics charts respectively showing each step in the operation of the apparatus of the second embodiment shown in FIG. 7.

The followings are description with respect to the attributes NBa, NSa, ZEa, PSa and PBa of the first cubic difference data Da in accordance with FIG. 8A. In the figure, a horizontal axis is the first cubic difference data Da, and a vertical axis is each belonging degree of each attribute. For example, when the first cubic difference data Da is as "aa", an attribute of the Da can be shown following equations (33) to (35), $$M(NBa, a1) = 0.8 \tag{33}$$

$$M(NSa, a1) = 0.2 \tag{34}$$

$$M(ZEa, a1) = M(PSa, a1) = M(PBa, a1) = 0 \tag{35}$$

The degrees of belonging G1a to G5a with respect to each attribute are processed by a look-up table method using the ROM in the microcomputer. When step S500 is completed, the operation advances to step S501.

Figure 8B:
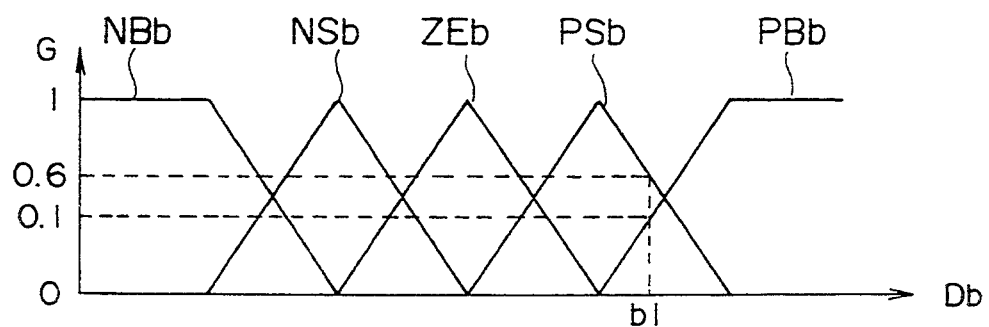

Step S501 determines belonging degrees G1b to G5b of attributes NBb to PBb of the second cubic difference data Db shown in FIG. 8B by the same method of step S500. For example, when the second cubic difference data Db is "bb", the degrees of belonging G1b to G5b are shown in the following equations (36) to (40), $$G1b = M(NBb, b1) = 0 \tag{36}$$

$$G2b = M(NSb, b1) = 0 \tag{37}$$

$$G3b = M(ZEb, b1) = 0 \tag{38}$$

$$G4b = M(PSb, b1) = 0.6 \tag{39}$$

$$G5b = M(PBb, b1) = 0.4 \tag{40}$$

Figure 8C:
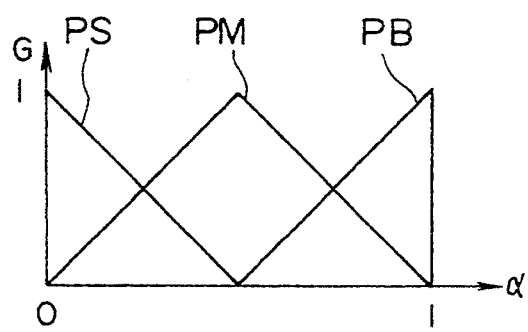

In step S502, an attribute and applied degree of the first weighting coefficient $\alpha$ shown in FIG. 8C are determined by a peak cutting method of the well-known fuzzy inference according to the following rules (a) to (m).

(a) An antecedent part is an attribute NBa of the first cubic difference data Da and an attribute PBb of the second cubic difference data Db, and a consequent part is an attribute PM of the first weighting coefficient $\alpha$. An applied degree of the antecedent part with an input selects a smaller one from degrees of belonging G1a and G5b. As a result, a conclusion of this rule is that a peak of PM is cut off by the applied degree.

(b) An antecedent part is an attribute PBa of the first cubic difference data Da and an attribute NBb of the second cubic difference data Db, and a consequent part is an attribute PM of the first weighting coefficient $\alpha$. An applied degree of the antecedent part with an input selects a smaller one from degrees of belonging G1a and G5b. As a result, a conclusion of this rule is that a peak of PM is cut off by the applied degree.

(c) An antecedent part is an attribute NSa of the first cubic difference data Da and an attribute PSb of the second cubic difference data Db, and a consequent part is an attribute PM of the first weighting coefficient $\alpha$. An applied degree of the antecedent part with an input selects a smaller one from degrees of belonging G2a and G4b. As a result, a conclusion of this rule is that a peak of PM is cut off by the applied degree.

(d) An antecedent part is an attribute PSa of the first cubic difference data Da and an attribute NSb of the second cubic difference data Db, and a consequent part is an attribute PM of the first weighting coefficient $\alpha$. An applied degree of the antecedent part with an input selects a smaller one from degrees of belonging G4a and G2b. As a result, a conclusion of this rule is that a peak of PM is cut off by the applied degree.

(e) An antecedent part is an attribute ZEa of the first cubic difference data Da and an attribute ZEb of the second cubic difference data Db, and a consequent part is an attribute PM of the first weighting coefficient $\alpha$. An applied degree of the antecedent part with an input selects a smaller one from degrees of belonging G3a and G3b. As a result, a conclusion of this rule is that a peak of PM is cut off by the applied degree.

(f) An antecedent part is an attribute NBa of the first cubic difference data Da and an attribute PBs of the second cubic difference data Db, and a consequent part is an attribute PS of the first weighting coefficient $\alpha$. An applied degree of the antecedent part with an input selects a smaller one from degrees of belonging G1a and G4b. As a result, a conclusion of this rule is that a peak of PS is cut off by the applied degree.

(g) An antecedent part is an attribute PBa of the first cubic difference data Da and an attribute NSb of the second cubic difference data Db, and a consequent part is an attribute PS of the first weighting coefficient $\alpha$. An applied degree of the antecedent part with an input selects a smaller one from degrees of belonging G5a and G2b. As a result, a conclusion of this rule is that a peak of PS is cut off by the applied degree.

(h) An antecedent part is an attribute NSa of the first cubic difference data Da and an attribute PBb of the second cubic difference data Db, and a consequent part is an attribute PB of the first weighting coefficient $\alpha$. An applied degree of the antecedent part with an input selects a smaller one from degrees of belonging G2a and G5b. As a result, a conclusion of this rule is that a peak of PB is cut off by the applied degree.

(i) An antecedent part is an attribute PSa of the first cubic difference data Da and an attribute NBb of the second cubic difference data Db, and a consequent part is an attribute PB of the first weighting coefficient $\alpha$. An applied degree of the antecedent part with an input selects a smaller one from degrees of belonging G4a and G1b. As a result, a conclusion of this rule is that a peak of PB is cut off by the applied degree.

(j) An antecedent part is an attribute ZEa of the first cubic difference data Da and an attribute PBb of the second cubic difference data Db, and a consequent part is an attribute PB of the first weighting coefficient $\alpha$. An applied degree of the antecedent part with an input selects a smaller one from degrees of belonging G3a and G5b. As a result, a conclusion of this rule is that a peak of PB is cut off by the applied degree.

(k) An antecedent part is an attribute ZEa of the first cubic difference data Da and an attribute PBb of the second cubic difference data Db, and a consequent part is an attribute PB of the first weighting coefficient $\alpha$. An applied degree of the antecedent part with an input selects a smaller one from degrees of belonging G3a and G5b. As a result, a conclusion of this rule is that a peak of PB is cut off by the applied degree.

(l) An antecedent part is an attribute NBa of the first cubic difference data Da and an attribute PSb of the second cubic difference data Db, and a consequent part is an attribute PS of the first weighting coefficient $\alpha$. An applied degree of the antecedent part with an input selects a smaller one from degrees of belonging G1a and G3b. As a result, a conclusion of this rule is that a peak of PS is cut off by the applied degree.

(m) An antecedent part is an attribute PBa of the first cubic difference data Da and an attribute ZEb of the second cubic difference data Db, and a consequent part is an attribute PS of the first weighting coefficient α. An applied degree of the antecedent part with an input selects a smaller one from degrees of belonging G5a and G3b. As a result, a conclusion of this rule is that a peak of PS is cut off by the applied degree.

The processing performed in the microcomputer uses each attribute and belonging degree corresponding to the first and second cubic difference data Da and Db obtained in steps S500 and S501 and sequentially executes the rules (a) to (m). Namely, there is read out any one of the attributes of the first weighting coefficient previously stored in the ROM according to each rule, and the applied degree obtained by the processing by the rule limits the attribute of the first weighting coefficient α which is read out as the upper limit value, and then, the calculation result is respectively stored in the RAM corresponding to the applied rule (a) to (m).

There is described how to apply the rules (a) to (m) when the first and second cubic difference data Da and Db are "aa" and "bb", respectively, and as an example of steps S500 and S501.

Figure 9A:
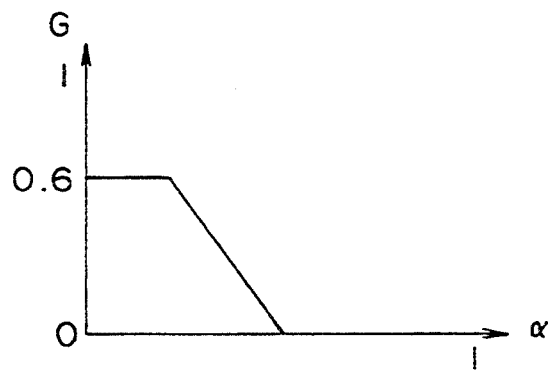
FIGS. 9A to 9D are characteristics charts respectively showing each step in the operation of the apparatus of the second embodiment shown in FIG. 7.
Figure 9B:
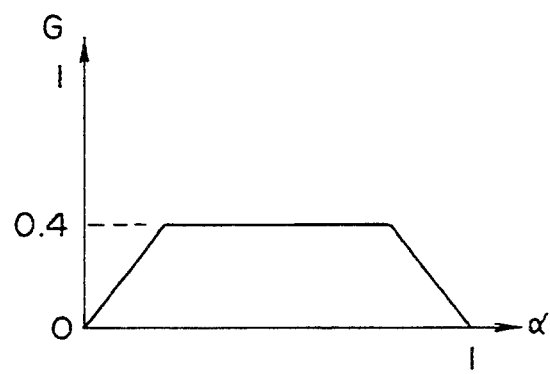
Figure 9C:
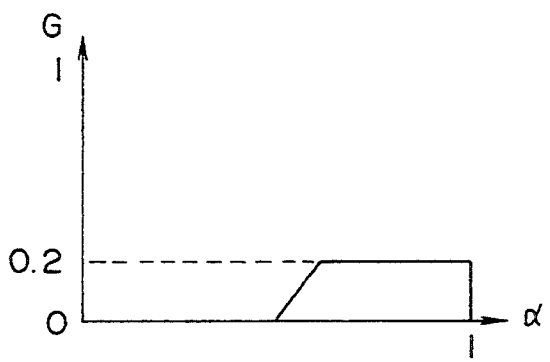

In the rule (a), the conclusion can be obtained that the peak of the attribute PM of the first weighting coefficient is cut off by the applied degree of "0.4". This conclusion is shown in FIG. 9B. In the rule (f), the conclusion can be obtained that the peak of the attribute PS of the first weighting coefficient α is cut off by the applied degree of "0.6". The conclusion is shown in FIG. 9A. In the rule (h), the conclusion can be obtained that the peak of the attribute PB of the first weighting coefficient α is cut off by the applied degree of "0.2". This conclusion is shown in FIG. 9C. All applied results of other rules is that the applied degree of the first weighting coefficient α is "0", and nothing means when a logical sum is calculated in step S503, thereby eliminating the description thereof. When processing in step S502 is completed, the operation advances to step S503.

In step S503, the first weighting coefficient α is determined by the so-called "center of gravity" method on the basis of the attribute of the first weighting coefficient α which is obtained in step S502. Namely, a logical sum of the conclusions obtained by the rules (a) to (m) is calculated and the center of gravity is obtained from a geometrical figure which is formed from the logical sum.

Figure 9D:
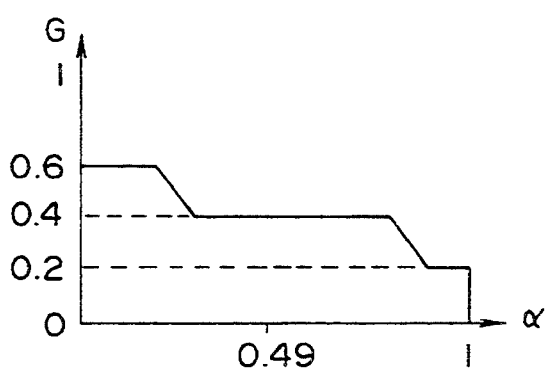

Here, step S503 is described in accordance with the specific example which is described in step S502. FIG. 9D shows logical sums of FIGS. 9A to 9C which are obtained by applying the rules (f), (a) and (h), thereby determining the first weighting coefficient α by obtaining the center of the gravity of this figure.

The above processing in the microcomputer is performed in the manner that at first the processed results of the rules (a) to (m) are sequentially read out from the RAM and the large value is stored in other RAM after comparing the processed results. Data stored in the other RAM are extracted at 0 in the order from a value which is calculated a half of the total sum of the data stored in the other RAM. When the extraction result changes from positive to negative or becomes 0, it can be obtained the desired first weighting coefficient α.

The operation advances to step S504 after completing step S503.

In step S504, the second weighting coefficient β is determined in the same manner of the above-mentioned step S56. Accordingly, when the operation advances from steps S500 to S504 in which the first and second weighting coefficients α and β, the operation advances to step ST6 and the above-mentioned processing in the first embodiment is performed. Therefore, it is possible to perform an automatic focusing by determining the first and second weighting coefficients α and β by using a fuzzy inference.

III. A Third Embodiment

The followings are a third embodiment with reference to FIG. 10. The different point of the third embodiment in comparison with the first and second embodiments is to provide a characteristic conversion means 20 having a third cubic differential circuit 23 in the place of the first and second cubic differential circuits 13 and 14 of the characteristic conversion means 10. Another component is the same as those of the first and second embodiments, thereby eliminating the duplicate description.

In the third embodiment, for determining the first and second weighting coefficients α and β, the characteristic conversion signal Q(x) is fed back to supply to the third cubic differential circuit 23 in which a third cubic differential circuit signal 23a is obtained by performing a cubic differential to the characteristic conversion means output signal Q(X) by the lens moving amount X so as to output the signal 23a to a weighting coefficient calculation circuit 25. As described above, since the characteristic conversion means 10 compresses a degree number of the edge extracted signal E(X) to a quadratic, the cubic differential circuit signal 23a should be zero. Accordingly, in order to be zero of the signal 23a, the weighting coefficient calculation circuit 25 determines the first and second weighting coefficients α and β by using a fuzzy inference which is described in detail in the second embodiment. It is possible to perform the automatic focusing on the basis of the first and second weighting coefficients.

In the third embodiment, even though the function conversion circuit is utilized by the first and second function conversion circuits 21 and 22, this invention is not limited in this construction. Since the degree number is finally set to the quadratic with respect to the characteristic converted signal Q(X), it is of course to use one kind or more than three kinds function conversion circuit or circuits.

Furthermore, even though the third embodiment determines the first weighting coefficient α by using the center of gravity method, namely, an area in step S503 because the attribute of the first weighting coefficient has an area in which the coefficients are distributed, it is of course to use the well-known method in which the attribute of the first weighting coefficient α is explained by the representative value to determine the center of the gravity in order to simplify the calculation.

By the third embodiment, since it is possible to compress the quadratic of the degree number, the imaging apparatus can be provided to perform the precise automatic focusing.

Furthermore, since the apparatus of the third embodiment determines lens moving amount δ between two fields on the basis of the focal point depth information in step ST2 in order to perform the precise calculation, the imaging apparatus can be provided to perform the precise automatic focusing.

Still furthermore, since the above embodiments use a fuzzy inference, it is possible to accurately determine the first and second weighting coefficients $\alpha$ and $\beta$ even though the first and second conversion data Ha and Hb include errors, the imaging apparatus can be provided to perform the precise automatic focusing.

What is claimed is:

1. An automatic focusing imaging apparatus including imaging means for imaging an image light from an objective through a lens system on a photoelectric plane of a photoelectric conversion device; a signal processing circuit for processing a video signal outputted from said imaging means; and edge extracting means for extracting an edge signal which is represented by an even function having an order greater than three for a lens moving amount of said lens system, said edge signal being extracted from an output signal of said signal processing circuit; said automatic focusing imaging apparatus further comprising:

characteristics conversion means for converting said edge signal to a converted edge signal which is represented by a quadratic function for a lens moving amount of said lens system;

calculation means for producing a control signal corresponding to said lens moving amount to a focal point in response to a proportion between a linear differential and a quadratic differential, said linear differential being obtained by calculating a linear differential of said converted edge signal with respect to said lens moving amount, and said quadratic differential being obtained by calculating a quadratic differential of said converted edge signal with respect to said lens moving amount; and drive means for driving said lens system according to said control signal outputted from said calculation means, to the focal point.

2. The imaging apparatus according to claim 1, wherein said characteristics conversion means comprises:

a first function conversion circuit for performing a function conversion of a focal point voltage outputted from said edge extracting means so as to output a first function converted signal;

a second function conversion circuit for performing a function conversion of said focal point voltage outputted from said edge extracting means so as to output a second function converted signal;

a first cubic differential circuit for performing a cubic differential of said first function converted signal so as to output a first cubic differential signal;

a second cubic differential circuit for performing a cubic differential of said second function converted signal so as to output a second cubic differential signal;

a coefficient calculation circuit for respectively calculating first and second weighting coefficients on the basis of said first and second cubic differential signals;

a first multiplication circuit for multiplying said first weighting coefficient with said first function conversion signal so as to output a first multiplied signal;

a second multiplication circuit for multiplying said second weighting coefficient with said second function conversion signal so as to output a second multiplied signal; and an addition circuit for adding said first multiplied signal with said second multiplied signal so as to output said characteristic conversion signal to said calculation circuit.

3. The imaging apparatus according to claim 2, wherein an operation of said first and second function conversion circuit comprises a step of judging for whether or not a present operation is within a distance measuring window interval;

a step of resetting first and second accumulated addition memories and accumulated addition counter;

a step of reading a focal point voltage from said edge extracting circuit;

a step of removing an offset voltage from said focal point voltage in order to improve an accuracy of the calculation in later steps;

a step of converting first and second functions by look-up table method using a read only memory (ROM);

a step of obtaining first and second accumulative function converted data;

a step of judging for whether or not an accumulative addition is repeated several times such as eight times;

a step of obtaining first and second conversion data by subtracting said first and second accumulative function converted data by a predetermined number such as eight;

a step of judging for whether or not the number of processing times are a predetermined number such as seven or more; and a step of storing first and second mean function conversion data and returning the operation to the first step.

4. The imaging apparatus according to claim 3, wherein an operation of said coefficient calculation circuit for respectively calculating first and second weighting coefficients on the basis of said first and second cubic differential signals, comprises a step of judging for whether or not first cubic distance data are less than a first reference value having a predetermined positive amount and second cubic distance data are larger than a second reference value having a predetermined negative amount;

a step of judging for whether or not first cubic distance data are larger than said first reference value and second cubic distance data are less than said second reference value;

a step of judging for whether or not an absolute value of said first cubic distance data is larger than an absolute value of said second cubic distance data;

a step of obtaining said first weighting coefficient in accordance with a predetermined equation; and a step of obtaining said second weighting coefficient by subtracting said first weighting coefficient from "1".

5. The imaging apparatus according to claim 3, wherein an operation of said coefficient calculation circuit for respectively calculating first and second weighting coefficients on the basis of said first and second cubic differential signals, comprises a step of determining a degree of belonging of an attribute of said first cubic difference data;

a step of determining a degree of belonging of an attribute of said second cubic difference data;

a step of processing said first weighting coefficient by a peak cutting method of a fuzzy inference according to a plurality of rules;

a step of determining said first weighting coefficient by means of a center of a gravity method; and a step of determining said second weighting coefficient by subtracting said first weighting coefficient from "1".

6. The imaging apparatus according to claim 1, wherein said characteristics conversion means comprises:

a first function conversion circuit for performing a function conversion of a focal point voltage outputted from said edge extracting means so as to output a first function converted signal;

a second function conversion circuit for performing a function conversion of said focal point voltage outputted from said edge extracting means so as to output a second function converted signal;

a coefficient calculation circuit for respectively calculating first and second weighting coefficients on the basis of said first and second cubic differential signals;

a first multiplication circuit for multiplying said first weighting coefficient with said first function conversion signal so as to output a first multiplied signal;

a second multiplication circuit for multiplying said second weighting coefficient with said second function conversion signal so as to output a second multiplied signal;

an addition circuit for adding said first multiplied signal with said second multiplied signal so as to output said characteristic conversion signal to said calculation circuit; and a third cubic differential circuit for applying a third cubic differential signal to said coefficient calculation circuit.

* * * * *